United States Patent
Mason et al.

(10) Patent No.: US 7,285,182 B2
(45) Date of Patent: Oct. 23, 2007

(54) COMPOSITION FOR SURFACE TREATMENT OF PAPER

(75) Inventors: Geoff Mason, Somerset (GB); Tomi Kimpimäki, Masku (FI); Kenneth Sundberg, Åbo (FI)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 24 days.

(21) Appl. No.: 10/508,349

(22) PCT Filed: Mar. 19, 2003

(86) PCT No.: PCT/FI03/00209

§ 371 (c)(1),
(2), (4) Date: Oct. 20, 2004

(87) PCT Pub. No.: WO03/078734

PCT Pub. Date: Sep. 25, 2003

(65) Prior Publication Data

US 2005/0119391 A1    Jun. 2, 2005

(30) Foreign Application Priority Data

Mar. 19, 2002    (FI)    ................................. 20020521

(51) Int. Cl.
*D21H 19/40*    (2006.01)
*D21H 19/50*    (2006.01)
*D21H 19/52*    (2006.01)
*D21H 19/54*    (2006.01)
*D21H 19/56*    (2006.01)

(52) U.S. Cl. .................. 162/135; 162/168.1; 162/174; 162/177; 162/181.7; 162/181.8; 106/124.1; 106/157.71; 106/206.1; 106/217.3; 106/287.17; 106/287.34; 106/415; 106/417

(58) Field of Classification Search ............. 428/32.15, 428/32.34, 32.37; 162/135, 168.1, 174, 177, 162/1, 181.7, 181.8; 106/124.1, 157.71, 106/206.1, 217.3, 287.17, 287.34, 415–417
See application file for complete search history.

(56) References Cited

U.S. PATENT DOCUMENTS

| | | | | |
|---|---|---|---|---|
| 3,453,131 A | * | 7/1969 | Fadner ....................... 106/416 |
| 3,508,952 A | * | 4/1970 | Eykamp et al. ............. 428/342 |
| 4,154,899 A | * | 5/1979 | Hershey et al. .......... 428/537.5 |
| 4,421,815 A | * | 12/1983 | Briggs et al. ............... 428/198 |
| 4,442,164 A | * | 4/1984 | Briggs et al. ............... 442/153 |
| 5,071,512 A | * | 12/1991 | Bixler et al. ................ 162/175 |
| 5,120,365 A | * | 6/1992 | Kogler ....................... 106/415 |
| 5,127,995 A | * | 7/1992 | Wason ..................... 162/181.6 |
| 5,178,730 A | * | 1/1993 | Bixler et al. ............. 162/168.3 |
| 5,230,734 A | * | 7/1993 | Kumasaka et al. ......... 106/464 |
| 5,279,663 A | * | 1/1994 | Kaliski ....................... 106/486 |
| 5,344,487 A | * | 9/1994 | Whalen-Shaw ............. 106/416 |
| 5,498,648 A | * | 3/1996 | de Clercq et al. ............ 524/47 |
| 6,338,891 B1 | * | 1/2002 | Kawasaki et al. ........ 428/32.31 |
| 2001/0003358 A1 | * | 6/2001 | Terase et al. ................. 252/62 |
| 2002/0012775 A1 | * | 1/2002 | Steiger et al. .............. 428/195 |
| 2002/0185239 A1 | * | 12/2002 | Kimpimaki et al. ........ 162/173 |

* cited by examiner

*Primary Examiner*—Steven P. Griffin
*Assistant Examiner*—Denis R. Cordray
(74) *Attorney, Agent, or Firm*—Shiela A. Loggins

(57) ABSTRACT

A composition for surface treatment of paper which includes a nanoparticle fraction, and a carrier fraction for detaining the nanoparticles in the surface layer. The carrier fraction includes plate-like pigment particles, and at least one binder. The invention also relates to the method of manufacturing the composition and to its use.

25 Claims, No Drawings

COMPOSITION FOR SURFACE TREATMENT OF PAPER

This application is a 371 of PCT/FI03/00209, filed Mar. 19, 2003 and claims priority to Finland Application No. 20020521, filed Mar. 19, 2002.

The present invention relates to a composition for surface treatment of paper, paperboard or the like defined in the preamble of the independent claim presented hereafter, to a method for manufacturing said composition, to a composition obtainable by said method, to a method for surface treatment of paper, paperboard or the like, to a use of said surface treatment composition and to a surface treated paper, paperboard or the like.

During the last decennium the use of inkjet printing paper has been steadily increasing together with the increasing use of computers both at home and at work. At the same time the need for reasonably priced quality inkjet printing paper has been growing. Computer users are interested in to print with normal office and home printers even more demanding documents, such as photos, where printing properties of the paper, like good resolution and minimal bleeding of ink, are of utmost importance. This, as well as the development of the printing technology, has put a strain on the printing properties of the inkjet printing paper.

Due to these market demands papermakers wish to improve the quality of their inkjet printing paper. Conventional inkjet printing papers can be roughly divided into two main groups, namely into surface sized printing paper and coated printing paper. The purpose of both surface sizing and coating is to affect the properties of the paper, such as its porosity, printability, smoothness and gloss.

Surface sized inkjet paper, such as normal office paper, is relatively cheap to produce, but its printing properties are poor as the ink easily penetrates into the paper, causing bleeding and loss of ink density and brightness. Surface sizing is usually carried out on-line in a sizing device fitted in the drying section of the paper machine, but it can also be carried out by means of a separate coating unit, e.g. when the paper machine does not have a surface sizing unit.

Surface sizing compositions are usually based on starch, carboxymethyl cellulose (CMC), polyvinyl alcohol, glucomannan, or water-soluble proteins. Mixtures of the above-mentioned substances can be also used. Starch can be native starch, degraded and/or chemically modified. Glucomannan can be in native form or chemically modified. Examples of protein that can be used are for example gelatin and casein, which can be in native form, or degraded and/or chemically modified.

Conventional coated inkjet printing paper has normally much better printing properties than the surface sized inkjet printing paper. Coating colour compositions comprise normally pigments, binders and additives. Coating is normally carried out by means of a separate coating unit, and the production costs are relatively high.

Nanoparticles, such as colloidal synthetic layered metal silica particles, has been used as pigment in coating colours for inkjet printing paper. Unfortunately nanoparticles are so small that they can easily flow into the base paper, when applied on the paper in conventional coating colours. When nanoparticles enter and accumulate the base paper they fail to function as intended, their effect on the surface properties of the paper being reduced. Also, when significant portion of applied nanoparticles is absorbed into the base paper, it is necessary to increase the amount of nanoparticles applied to achieve the desired surface properties. This results an unacceptable increase in coating costs. Accumulation of nanoparticles can also have a negative impact on paper properties, for example by destroying the internal sizing that can be seen as faster liquid penetration into the paper.

Document EP 655 346 discloses a coating composition for paper, said composition containing cationic colloidal silica, which is preferably non-spherical and a binder which is preferably polyvinyl alcohol. Ultrafine inorganic pigments can be included in addition to the non-spherical cationic colloidal silica. Organic or inorganic pigments may be used together with the ultrafine inorganic pigments. This document does however not disclose a separate carrier fraction.

Document EP 759 365 presents a coating composition for paper, said composition containing a dispersion of colloidal silica and a water-soluble binder such as polyvinyl alcohol. Colloidal silica having a particle diameter from 10 nm to 300 nm can be used. Also other pigments may be added and a small amount of high molecular latex. This document does however also not disclose a separate carrier fraction.

In this application, surface treatment includes both coating and surface sizing of paper, paperboard or the like. By surface sizing composition, it is meant a surface treatment composition wherein the dry matter content is below 40%, the amount of water-soluble binder is over 50% of the dry matter, the viscosity of the composition is relatively low and it is used in an amount that is less than 5 $g/m^2$, calculated as dry, per side. Typically, the dry matter content of a surface sizing composition is below 25%, the amount of water-soluble binder is over 70% or even over 80% and it is used in an amount as low as below 2.5 $g/m^2$.

The object of the present invention is to provide an improved composition for surface treatment of paper, paperboard or the like, by means of which the above-mentioned problems can be minimised or eliminated.

The object is thus to provide a surface treatment composition for paper, paperboard or the like, by means of which the printing properties, especially inkjet printing properties, can be improved. One object is also to provide a surface treatment composition useful for treating speciality papers such as release paper and envelope paper.

Another object of the present invention is to provide a surface sizing composition for paper, paperboard or the like, by means of which especially the inkjet printing properties can be improved.

In order to achieve the above-mentioned objects the present invention is characterised in what is defined in the characterising parts of the independent claims presented hereafter.

A typical composition for surface treatment of paper, paperboard or the like, according to the present invention comprises
   a nanoparticle fraction, and
   a carrier fraction comprising
      plate-like pigment particles, and
      at least one binder.

As has been stated above, the term surface treatment encompasses surface sizing. Indeed, according to the present invention, a typical composition for the surface sizing of paper, paperboard or the like comprises a surface sizing fraction comprising a water-soluble main component, such as starch, polyvinyl alcohol, carboxymethyl cellulose, glucomannan, protein, or a mixture thereof, and in addition
   a nanoparticle fraction, and
   a carrier fraction comprising
      plate-like pigment particles, and
      at least one binder.

Now it has been surprisingly found out that inkjet printing paper with good printing properties can be obtained when the paper is surface treated, e.g. surface sized with a composition comprising nanoparticles and a carrier fraction. Carrier fraction will help to detain the nanoparticles on the surface layer of the surface treated paper and inhibit the absorption and accumulation of the nanoparticles into the base paper. As the nanoparticles are captured in the surface layer formed during the surface treatment of the paper, they can give good surface properties for the paper, which is treated. This enables the production of inkjet printing paper, which has excellent printing properties, at reasonably low cost.

As the surface treatment according to the present invention can be carried out by means of conventional surface sizing unit, no expensive investments are needed for separate coating units. Paper mills, which today produce surface sized inkjet paper, can use their existing surface sizing equipment for surface treatment of paper according to the present invention. The present invention may therefore enable production of inkjet printing paper of high quality with low investment costs.

The present invention can be used for surface treatment, e.g. surface sizing of paper, paperboard or other corresponding web-like materials produced from pulp. In the description the word "paper" has been used for reasons of legibility, but it should be understood to cover also paperboard and/or other corresponding web-like materials produced from pulp.

The term "nanoparticle" when used in context of the present invention includes all kinds of pigment and/or mineral particles with size ranging from 5 to 500 nm. The particle size here denotes the largest dimension of the particle. The nanoparticle size is preferably from 10 to 100 nm, more preferably from 15 to 50 nm. In some embodiments of the invention the nanoparticle size varies from 10 to 200 nm, preferably from 15 to 75 nm. According to one preferred embodiment of the present invention the used nanoparticles are synthetic silica particles, such as colloidal synthetic layered silicates, or precipitated calcium carbonate (PCC) nanoparticles or other corresponding nanoparticles.

Nanoparticles are preferably used as an aqueous slurry. Nanoparticles can be in the form of clusters of particles, which cluster's dimensions are typically in the micrometer range. These clusters disintegrate into nanoparticles when the product is mixed with water. The dry matter content of the slurry is typically in the range of 10-20%. The slurry may also comprise additives such as dispersing agent and/or pH control agent.

The proportion of the nanoparticle fraction to the carrier fraction in the surface treatment composition according to present invention is typically 5/95-95/5, more typically 20/80-80/20, most typically 20/80-60/40, calculated as dry matter.

As the nanoparticles are small, a great number of them can exist in a thin layer. The present invention makes it possible to detain the nanoparticles in the surface layer of the surface treated paper. Therefore the number of nanoparticles in the surface layer can become high, even if the layer of the surface treatment composition itself on the paper surface is thin. This can enable sizing or coating of thinner surface layers, i.e. using smaller amount of surface treatment composition per square meter of paper. Good surface properties can still be obtained for surface treated paper due to the closely packed nanoparticles.

The plate-like or slate-like pigment particles in the carrier fraction of the present invention can be mineral particles, such as silicate particles, mica particles, kaolin particles, bentonite particles, alumina trihydrate particles, phyllosilicate particles, such as talc particles or organic pigment particles, such as plastic pigment particles. Preferably the plate-like pigment particles are kaolin particles or phyllosilicate particles, such as talc. The size of the pigment particles in the carrier fraction usually varies between 1-100 µm, being typically under 50 µm, being typically over 1 µm. Frequently the size of the pigment particles in the carrier fraction varies between 1-10 µm.

The plate-like pigment particles can detain the nanoparticles on the surface layer of the paper being surface treated, either by mechanical interactions or by physical interactions, or both. The size of the plate-like particles can be large enough to block the spaces between the fibres in the paper, i.e. they can reduce the paper porosity, thus reducing absorption of nanoparticles in the base paper. The plate-like pigment particles can also detain nanoparticles by other interactions, such as physical and/or chemical interactions, for example by electrical forces.

As the plate-like pigment particles can capture the nanoparticles in the surface layer, the present invention can also reduce the total amount of nanoparticles, which are applied on the paper. With the present invention desired surface properties may be obtained by using smaller total amount of nanoparticles, as they will stay in the surface layer, and not be so highly absorbed in the base paper.

The proportion of the plate-like pigment particles in the carrier fraction of surface treatment composition is typically between 20 and 80% of the solids content, more typically between 35 and 75%, most typically between 40 and 70%.

The carrier fraction comprises also at least one binder, such as polymer latex and/or other corresponding binder. Preferably the binder is polymer latex, such as styrene butadiene, acrylate, styrene acrylate or polyvinyl acetate latex or mixture thereof. The binder can also be a water-soluble binder, either a derivative of natural polymers, such as starch, protein, carboxymethyl cellulose or other cellulose derivative, or a fully synthetic polymer, such as polyvinyl alcohol, or a mixture of different water-soluble binders. Proportion of the binder is preferably between 5-75% of the solids content, more preferably between 15-45%, most preferably between 20-40%. The amount of binder is usually under 60%.

According to another embodiment of the invention the surface treatment composition can also comprise a water-soluble component, such as starch, polyvinyl alcohol, carboxymethyl cellulose (CMC), glucomannan, protein, or their mixture.

According to another embodiment of the invention the composition for surface treatment of paper can comprise in addition to the nanoparticles and carrier fraction also one or more additional components, such as hydrophobic agents, antifoaming or defoaming agents and/or salts, surface tension agents, rheology modifiers, plasticising agents, lubricants, optical brightening agents, colouring agents and/or cross-linkers.

According to one preferred embodiment the nanoparticle fraction of the surface treatment composition comprises synthetic silica nanoparticles or precipitated calcium carbonate nanoparticles, and the carrier fraction comprises talc and/or kaolin as pigment particles and styrene-butadiene latex as a binder.

Surface treatment composition according to one embodiment of the present invention comprises a surface sizing fraction, known per se, and a nanoparticle fraction and a carrier fraction for detaining the nanoparticles in the surface layer. The carrier fraction comprises plate-like or platy pigment particles and a binder. In this surface treatment composition the proportion of the surface sizing fraction to the sum of the nanoparticle and carrier fractions, calculated as dry matter, is typically 20/80-80/20, more typically 20/80-50/20.

Surface treatment composition according to one embodiment of the present invention can be prepared simply by mixing together the nanoparticle and carrier fractions so that they form a relatively homogenous mixture. This mixture is then added to a surface sizing fraction, known per se, to form a surface sizing composition.

According to another embodiment of the invention the nanoparticle and carrier fractions can be mixed independently with the surface sizing fraction. In that case it is not necessary to mix first the nanoparticle fraction with the carrier fraction before addition to the surface sizing fraction. The carrier fraction comprising platy pigment particles can be mixed first to the surface sizing fraction and then the nanoparticle fraction can be added to this mixture containing surface sizing fraction and carrier fraction. Carrier and nanoparticle fractions can also be added to the surface sizing fraction alternately, or separately and independently at the same time.

According to the present invention, a method for manufacturing a composition according to the present invention typically comprises the following steps:
the carrier fraction is prepared by mixing the plate-like pigment particles and at least one binder,
said carrier fraction is mixed with the nanoparticle fraction.

A method for manufacturing a surface sizing composition according to the present invention is typically characterised in that
the carrier fraction is prepared by mixing the plate-like pigment particles and at least one binder,
said carrier fraction, the nanoparticle fraction and the surface sizing fraction are mixed together.

According to an embodiment of the invention, the nanoparticle fraction is mixed with solvent prior to mixing with the at least one other fraction to form a slurry. The solvent is preferably water.

According to another embodiment of the invention, the nanoparticle fraction and the carrier fraction are mixed together before addition to the surface sizing fraction. Furthermore, the nanoparticle fraction and the carrier fraction may be mixed independently to the surface sizing fraction. Indeed, as long as the carrier fraction is prepared separately, the fractions can be added to each other in any order, simultaneously or not, as will be apparent for a person skilled in the art.

It is believed that since the components of the carrier fraction are mixed together so that the mixture's solids content is high, a good dispersion is easily obtained. Such a good dispersion can be reached when the solids content is low only by mixing for a considerably longer period or by using a greater mixing force. Indeed, when the solids content is high, the components physically interact more with each other than if the solids content is low.

According to the present invention in a typical surface treatment method of paper, paperboard or the like, the paper is treated by applying to the paper surface a composition comprising a nanoparticle fraction, and a carrier fraction, which comprises plate-like pigment particles and at least one binder. The carrier fraction will help to detain the nanoparticles in the surface layer of the surface treated paper.

Surface treatment of paper according to the present invention is preferably carried out by means of conventional surface sizing unit, such as size press, film press or the like. If coating units are available, surface treatment can be carried out in them. Coating units can be either separate or integrated to the paper machine, i.e. on-line coating units.

According to one preferred embodiment of the present invention the surface treatment composition is applied on the paper web when the dry matter of the web is $\geq 75\%$, preferably $\geq 85\%$, most preferably $\geq 90\%$.

As stated above, surface treatment of paper, paperboard or the like according to the present invention encompasses surface sizing, coating and other similar surface treatments of paper. According to one preferred embodiment of the present invention the surface treatment composition is used for surface sizing of paper. The compositions according the present invention can also be used for other surface treatment, for example for coating of paper. The surface treatment composition according to the present invention may also be used in the manufacturing of other printing papers than inkjet paper, and also for specialty papers such as release paper and envelope paper, wherein the porosity of the paper surface is decreased.

Preferably the composition for surface treatment of paper according to present invention can be applied by means of already existing machines for surface treatment of paper. The amount applied is typically 0.5-15 g/m² of surface treatment composition, calculated as dry, per side. The amount may be selected for example from the ranges 0.5-5 g/m², 1.5-10 g/m², 5-15 g/m², 10-15 g/m² or 7-12 g/m². For a surface sizing composition, an amount typically less than 5 g/m², more typically less than 3 g/m², calculated as dry, per side, is used. Also larger or smaller amounts can be applied if necessary.

According to one embodiment of the present invention the printing properties of the paper that has been surface treated, e.g. surface sized will closely match the printing properties of matte coated inkjet printing paper. Use of a composition according the present invention in paper coating can also enhance the properties of coated paper when compared to papers coated with conventional coating colours.

According to one preferred embodiment of the present invention the surface treatment composition is applied on the surface of printing paper or release paper. The present invention enables the production of smooth paper surface and enhances the printing properties of office paper. In release paper the smooth surface and low porosity can help to minimise the amount of silicone used in siliconising.

The surface treatment composition according to present invention can be also used for surface treatment of other inkjet recording material, such as plastic films. It can be also used for surface treatment of other paper-like materials or paperboard.

The present invention is further illustrated by the following non-limiting examples. The materials are given as amounts of solids content, if not otherwise stated. The proportions used are also as amounts of solids content.

EXAMPLE 1

A carrier fraction was prepared by mixing 64.4% talc granulates, 34.8% styrene-butadiene latex, 0.5% antifoaming agent and 0.3% dispersing agent and water in a mixer. After the mixing the solid content of the carrier fraction was adjusted to 45% with water.

The carrier fraction was then further mixed in a mixer with a nanoparticle fraction (in slurry form, solids content 15%) in proportion 50/50 in order to obtain a composition for surface treatment of paper. As nanoparticles synthetic silicate particles having a mean particle size around 25 nm were used. The solid content was adjusted to 20% with water.

The obtained surface treatment composition was then added to a starch solution (solids content 15%). The proportion of the starch solution to the surface treatment composition was 50/50. This mixture was then applied on a paper surface in amount 6 g/m$^2$ in a coating unit.

EXAMPLE 2

A carrier fraction was prepared by mixing 67.5% talc slurry (solids content 60%), 30% styrene-acrylate latex, 2% plasticizing agent, 0.4% antifoamning agent and 0.1% dispersing agent in a mixer. After the mixing the dry solids content of the carrier fraction was adjusted to 55% with water.

The carrier fraction was then further mixed in a mixer with a nanoparticle fraction (in slurry form, solids content 10%) in proportion 70/30 to obtain a composition for surface treatment of paper. As nanoparticles synthetic silicate particles having a mean particle size around 25 nm were used. The solid content was adjusted to 20% with water.

The obtained surface treatment composition was then added to polyvinyl alcohol (PVA) solution (solids content 20%). The proportion of the PVA solution to the surface treatment composition was 80/20. This mixture was then applied on a paper surface in amount 2.5 g/m$^2$ by using film transfer unit.

EXAMPLE 3

A carrier fraction was prepared by mixing 65% polyvinyl alcohol, 20% kaolin, 10% CMC and 5% hardening agent in a mixer. After mixing the solids content of the carrier fraction was adjusted to 15%.

The carrier fraction was then further mixed in a mixer with a nanoparticle fraction (in slurry form, solids content 18%) in proportion 93/7 to obtain a composition for surface treatment of paper. As nanoparticles synthetic silicate particles having a mean particle size around 25 nm were used. The solid content was adjusted to 15% with water.

The obtained surface treatment composition was then applied directly on a paper surface in amount 2 g/m$^2$ in a size press unit.

COMPARATIVE EXAMPLE 1

The components of the carrier fraction of example 1 were added one after another to the nanoparticle fraction, i.e. no carrier fraction was prepared separately. The obtained composition was used as in example 1.

COMPARATIVE EXAMPLE 2

The components of the carrier fraction of example 2 were added one after another to the nanoparticle fraction, i.e. no carrier fraction was prepared separately. The obtained composition was used as in example 2.

COMPARATIVE EXAMPLE 3

The components of the carrier fraction of example 3 were added one after another to the nanoparticle fraction, i.e. no carrier fraction was prepared separately. The obtained composition was used as in example 3.

Furthermore, Examples 1 and 2 were repeated but the carrier fraction and carrier components were not used at all. These are denoted as Examples without carrier in Table 1 below.

Papers, which were surface treated according to examples 1-3 and comparative examples 1-3, were evaluated both by visual evaluation and by using time-of-flight secondary-ion mass spectrometry (TOF-SIMS). The results are given in Table 1, wherein the figures give the number of counts of nanoparticle specific ions.

TABLE 1

|  | 1 | 2 | 3 |
|---|---|---|---|
| Example | 4319 | 2497 | 873 |
| Comparative example | 1714 | 1099 | 780 |
| Example without carrier | 103 | 27 |  |

In visual evaluation it was discovered that the inkjet printing properties of the papers surface treated with surface treatment compositions according to examples 1-3 was much better than printing properties of conventional office inkjet papers. The printing quality was much more even and the colours were brighter.

By using TOF-SIMS certain chemical elements that originate from nanoparticles were detected on the paper surface. It was discovered that papers surface treated according to examples 1-3 the amount of these elements was significantly higher than in papers coated with nanoparticles without carrier fraction, carrier fraction being as defined in the present invention, i.e. separately prepared. This indicates that the carrier fraction in the surface composition according to present invention effectively detains the nanoparticles in the surface layer of the paper.

The compositions for surface treatment and for surface sizing of paper according present invention enable therefore production of inkjet printing paper with excellent inkjet printing properties. These superior printing properties can be obtained at relatively low cost, when the surface treatment composition can be applied at conventional surface sizing units.

When using the present invention for coating of paper the amount of coating colour needed per square unit of paper is reduced, as the nanoparticles are detained in the surface layer and not absorbed by the base paper. This will help to reduce the coating costs, because a smaller amount of the coating colour is needed in order to still obtain good surface properties.

In this specification, except where the context requires otherwise, the words "comprise", "comprises" and "comprising" means "include", "includes" and "including", respectively. That is, when the invention is described or defined as comprising specified features, various embodiments of the same invention may also include additional features.

It will be appreciated that the essence of the present invention can be incorporated in the form of a variety of embodiments, only a few of which are disclosed herein. It will be apparent for the specialist in the field that other embodiments exist and do not depart from the spirit of the invention. Thus, the described embodiments are illustrative and should not be construed as restrictive.

The invention claimed is:

1. A surface treated paper or paperboard comprising paper or paperboard surface treated with a surface treating composition comprising a) a nanoparticle fraction comprising nanoparticles, and
b) A carrier fraction comprising plate-like pigment particles and at least one binder,
wherein the carrier fraction is obtained by mixing the plate-like pigment particles with the binder before combining the carrier fraction with the nanoparticle fraction and the nanoparticles are between 15 and 75 nm, wherein the binder is a latex, a water soluble binder or mixtures thereof, and the water soluble binders are selected from the group consisting of starch, protein, carboxymethyl cellulose, other cellulose derivative, polyvinyl alcohol and mixtures thereof, and the latex is selected from the group consisting of styrene butadiene, acrylate, styrene acrylate, polyvinyl acetate and mixtures thereof and the binder is between 15 to 75% of the solids content of the carrier fraction.

2. The surface treated paper or paperboard according to claim 1, further comprising a surface sizing fraction comprising a water-soluble component.

3. The surface treated paper or paperboard according to claim 2, wherein the water-soluble main component is selected from the group consisting of starch, polyvinyl alcohol, carboxymethyl cellulose, glucomannan, protein and mixtures thereof.

4. The surface treated paper or paperboard according to claim 1, wherein the plate-like pigment particles in the carrier fraction comprise mineral particles, organic pigment particles or mixtures thereof.

5. The surface treated paper or paperboard according to claim 4, wherein the plate-like pigment particles are selected from the group consisting of silicate particles, mica particles, kaolin particles, bentonite particles, alumina trihydrate particles, phyllosilicate particles, talc particles, plastic pigment particles and mixtures thereof.

6. The surface treated paper or paperboard according to claim 5, wherein the pigment particles are selected from the group consisting of kaolin particles, talc particles and mixtures thereof.

7. The surface treated paper or paperboard according to claim 1, wherein the binder is a polymer latex selected from the group consisting of styrene butadiene, acrylate, styrene acrylate, polyvinyl acetate and mixtures thereof.

8. The surface treated paper or paperboard according to claim 1, wherein the binder is selected from the group consisting of starch, protein, carboxymethyl cellulose, polyvinyl alcohol and mixtures thereof.

9. The surface treated paper or paperboard according to claim 1, wherein the nanoparticles are synthetic silica particles, precipitated calcium carbonate particles or mixtures thereof.

10. The surface treated paper or paperboard according to claim 1, wherein proportion of the nanoparticle fraction to the carrier fraction is 5/95-95/5, calculated as dry matter.

11. The surface treated paper or paperboard according to claim 1, wherein the proportion of the plate-like pigment particles is between 20 and 80% of the solids content of the carrier fraction.

12. The surface treated paper or paperboard according to claim 1, wherein the composition comprises in addition one or more additional components.

13. The surface treated paper or paperboard according to claim 12, wherein the additional component is selected from the group consisting of hydrophobic agents, antifoaming agents, antifoaming salts, defoaming agents, defoaming salts, surface tension agents, rheology modifiers, plasticising agents, lubricants, optical brightening agents, colouring agents and cross-linkers.

14. The surface treated paper or paperboard according to claim 1, wherein
a) the nanoparticle fraction comprises synthetic silica particles, and
b) the carrier fraction comprises talc particles, and styrene-butadiene latex.

15. The surface treated paper or paperboard according to claim 2, wherein the proportion of the surface sizing fraction to the sum of the nanoparticle and carrier fractions, calculated as dry matter, is 20/80-80/20.

16. A method for manufacturing a the surface treating composition according to claim 1, wherein
i.) the carrier fraction is prepared by mixing the plate-like pigment particles and at least one binder, and
ii.) said carrier fraction is mixed with the nanoparticle fraction.

17. A Method for manufacturing the surface treating composition according to claim 2, wherein
i.) the carrier fraction is prepared by mixing the plate-like pigment particles and at least one binder, and
ii.) said carrier fraction, the nanoparticle fraction and the surface sizing fraction are mixed together.

18. The method according to claim 16, wherein the nanoparticle fraction is mixed with water prior to mixing with the carrier fraction.

19. The method according to claim 17, wherein the nanoparticle fraction and the carrier fraction are mixed together before addition to the surface sizing fraction.

20. The method according to claim 17, wherein the nanoparticle fraction and the carrier fraction are mixed independently to the surface sizing fraction.

21. A method for surface treatment of paper or paperboard, wherein the paper or paperboard is treated by applying to the surface of the paper or paperboard a composition comprising
a) a nanoparticle fraction, and
b) a carrier fraction comprising a-plate-like pigment particles and at least one binder, wherein the carrier fraction is obtained by mixing the plate-like pigment particles with the binder before combining the carrier fraction with the nanoparticle fraction and the nanoparticles are between 15 and 75 nm, wherein the binder is a latex, a water soluble binder or mixtures thereof, and the water soluble binders are selected from the group consisting of starch, protein, carboxymethyl cellulose, other cellulose derivative, polyvinyl alcohol and mixtures thereof, and the latex is selected from the group consisting of styrene butadiene, acrylate, styrene acrylate, polyvinyl acetate and mixtures thereof and the binder is 15 to 75% of the solids content of the carrier fraction.

22. A method according to claim 21, wherein the composition is applied by means of a surface treatment unit.

23. A method according to claim 22, wherein the surface treatment unit is a size press, a film press or a coating unit.

24. A method according to claim 21, wherein before the composition is applied to a web of paper or paperboard the web is dried to a dry matter of $\geq 75\%$.

25. A method according to claim 21, wherein the amount of surface treatment composition applied to the surface is 0.5-15 g/m$^2$.

* * * * *